C. BLUM.
MOTOR CAR.
APPLICATION FILED NOV. 25, 1915.

1,263,641.

Patented Apr. 23, 1918.

Inventor
Charles Blum

UNITED STATES PATENT OFFICE.

CHARLES BLUM, OF SURESNES, FRANCE.

MOTOR-CAR.

1,263,641. Specification of Letters Patent. Patented Apr. 23, 1918.

Application filed November 25, 1916. Serial No. 133,438.

*To all whom it may concern:*

Be it known that I, CHARLES BLUM, a citizen of the Republic of France, residing at Suresnes, Rue de Longchamps, (Seine Department,) in the Republic of France, engineer, have invented certain new and useful Improvements in Motor-Cars, of which the following is a specification.

This invention has for its object an improvement of the driving bridge of motorcars.

In the case of transmission of motive power to the driving wheels by means of lateral universal joints, with a suspended gear-box, it has been noticed that the universal joints, while readily absorbing changes in the angles between shaft and gearing, as far as they are due to jolting, will not so well take up those due to changes in the load of the car.

This inconvenience has principally been noticed in trucks for conveying goods, where the weight of the load is subject to most important changes. It is therefore desirable to retain in a static state (or condition) of the truck, whatever may be its load, the lateral coupling shafts in a horizontal or substantially horizontal plane.

This result is realized, according to the present invention, by connecting the gear box to the frame of the truck through the medium of a device permitting of regulating the vertical distance between both parts.

This device may either be acted upon automatically under the influence of the load, viz. proportionally to the lowering, of the frame with reference to the hind axle, or it may be under the positive control of driver.

In the accompanying drawing are shown two examples embodying the present invention.

Figure 1:
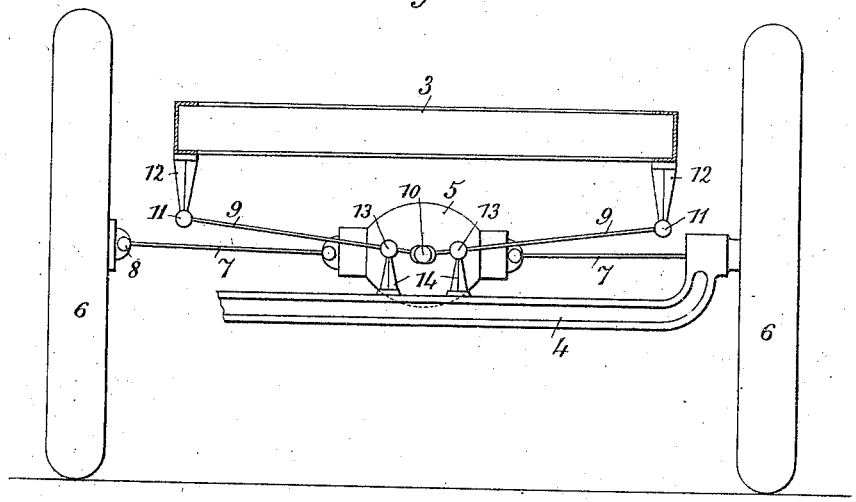
Figure 1 is a back-side view of a motor-car provided with means for automatically regulating the distance of the differential gearing from the frame of the car, so as to keep the coupling shafts substantially horizontal.

In Fig. 1 of the drawing, 3 is the frame of the motor-car, which is bearing in the usual manner upon the axle 4 through the medium of springs (which are not shown in the drawing). The differential gearing 5 is fitted to drive in a well known manner both of the hind wheels 6 by means of a coupling comprising a shaft 7, and two universal joints 8.

According to the present invention the differential gearing is connected to the frame through the medium of two levers 9, one end of each lever being hinged to a journal 10 which is fixed upon the differential gearing, the opposite end of each being hinged to a journal 11 which is suspended on the frame by means of a depending leg 12. These levers are acted upon automatically, being journaled, intermediately between their ends, upon journals 13 supported on the axle 4 by means of brackets 14, in such a way that when a heavier load lowers the frame by bending the suspension springs, the levers will swing around the journals 13 and will raise the differential gearing. The journals 13 are, moreover, positioned in such a way that the vertical motions of the differential gearing will be very small as compared to those of the frame, so that the connecting shafts will remain in a substantially horizontal position, whatever may be the weight of the load on the car.

Elastic means may be provided, if necessary, between the levers and the parts of the car to which they are connected.

Figure 2:
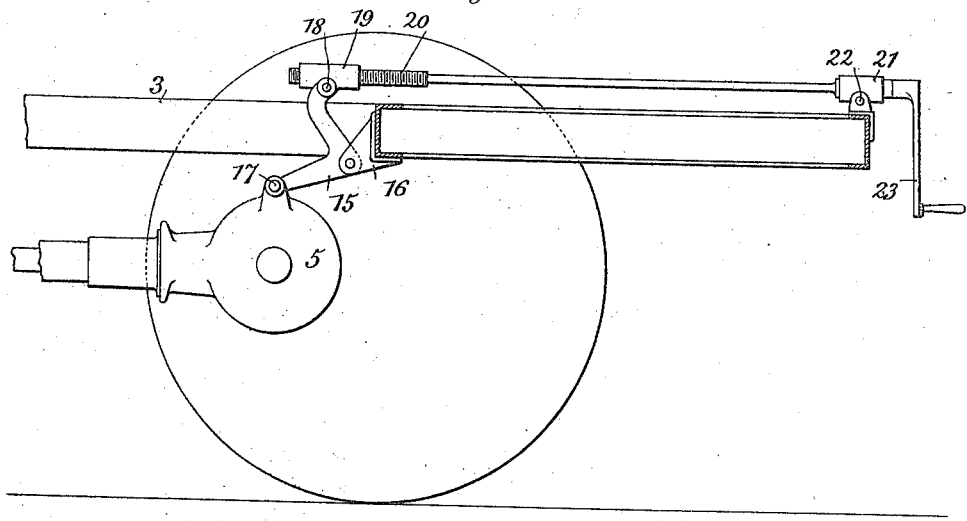
Fig. 2 is a longitudinal sectional view of a motor-car provided with regulating means controlled by the driver.

In the case of Fig. 2, the differential gearing 5 is connected to the frame 3 by means of a bell crank lever 15 which is journaled upon a bracket 16 fixed upon the frame, one end of said lever being hinged to the differential gearing as in 17, while the opposite end is hinged at 18 to a nut 19 which the driver may shift by turning a screw 20. The latter is rotatably mounted in a swinging block 21 which is connected to the frame as in 22, and it is provided with a handle 23.

It will be understood that these two embodiments of the invention are described only as examples.

Having now particularly described and ascertained the nature of my said invention, and in what manner the same is to be performed, I declare that what I claim is:

1. In a motor vehicle comprising a frame, hind-wheels, a hind-axle, a differential gearing and two universal joints with shafts connecting said wheels to the differential gear, means for raising and lowering the differential gear with reference to the frame, in order to allow the connecting shafts between the universal joints and the wheels to be kept in a substantially horizontal position whatever may be the lowering of the frame under the influence of the load.

2. In a motor vehicle the combination of a frame, hind-wheels, a hind-axle, a differential gear, two universal joints connecting said wheels to the differential gear, and two levers, the inner end of each of these levers being hinged to the differential gear, the outside end being movably connected to the frame, and an intermediate point of each lever being fulcrumed upon the axle.

In testimony, that I claim the foregoing as my invention I have signed my name in presence of two subscribing witnesses.

CHARLES BLUM.

Witnesses:
CHARLES BAUDRY,
CHAS. P. PRESSLY.

Copies of this patent may be obtained for five cents each, by addressing the "Commissioner of Patents, Washington, D. C."